United States Patent
Ng et al.

(10) Patent No.: US 7,889,251 B1
(45) Date of Patent: Feb. 15, 2011

(54) METHOD AND DEVICE FOR WHITE LEVEL CALIBRATION

(75) Inventors: Chung Wai Ng, Mountain View, CA (US); David Boisvert, Saratoga, CA (US); Kunhong Qu, San Jose, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 999 days.

(21) Appl. No.: 11/149,128

(22) Filed: Jun. 8, 2005

(51) Int. Cl.
*H04N 5/16* (2006.01)

(52) U.S. Cl. .................. 348/257; 348/222.1; 348/223.1; 358/504; 358/446; 358/406; 358/461; 358/516

(58) Field of Classification Search ................... 348/257
See application file for complete search history.

(56) References Cited

U.S. PATENT DOCUMENTS

| 5,267,053 | A | * | 11/1993 | Potucek et al. ............... 358/446 |
| 5,282,024 | A | * | 1/1994 | Takei ....................... 348/223.1 |
| 5,519,441 | A | * | 5/1996 | Gusmano et al. ........ 348/207.99 |
| 6,067,175 | A | * | 5/2000 | Heuer et al. ................. 358/516 |
| 2002/0054374 | A1 | * | 5/2002 | Inoue et al. .................. 358/461 |
| 2002/0158192 | A1 | * | 10/2002 | Gann ......................... 250/234 |
| 2005/0162562 | A1 | * | 7/2005 | Nave ......................... 348/678 |

* cited by examiner

*Primary Examiner*—Sinh Tran
*Assistant Examiner*—Paul Berardesca

(57) ABSTRACT

Calibrating a white level in an image scanning device. A target white level is accessed. A high white level is determined for pixel data output by an amplifier. A gain adjustment to the amplifier is determined to correct a portion of an error between the target white level and the high white level. The gain adjustment is applied to the amplifier.

15 Claims, 6 Drawing Sheets

METHOD AND DEVICE FOR WHITE LEVEL CALIBRATION

TECHNICAL FIELD

Embodiments of the present invention generally pertain to the field of electronic circuits. More particularly, embodiments of the present invention are related to calibrating a white level of an image scanning device.

BACKGROUND ART

A typical image scanning device captures data by irradiating the object being scanned and capturing image data with charge coupled devices (CCD) or the like. The CCDs convert light reflected from the object to an analog electrical signal. In a typical photocopier there are thousands of CCDs per line of a scanned page with each line being scanned in succession. The data from each CCD is amplified and converted to digital data by an analog-to-digital converter (A/D), which outputs "codes."

The highest output of the CCDs, which corresponds to the highest output code of the A/D, is commonly referred to as the "white level." If the CCDs are sensitive to light of a particular color (e.g., red, green, or blue), the term white level is still used to refer to the highest output of the CCDs. The lowest output of the CCDs is commonly referred to as the black level.

Typically, target values for the A/D to output for the white and black levels are established to allow a wide range of output codes in the A/D. For example, for a 10-bit A/D the target white level code may be 960, while the target black level code may be 32.

To calibrate the white code level, a white reference region may be scanned. For example, the white region is scanned to determine white level codes output by the A/D. Based on the white level codes and a target white level code, the white level is calibrated. An adjustment may be made to an amplifier to calibrate the white level based on the analysis. Typically, only a few scan lines of white reference data may be collected. Therefore, the calibration should quickly converge to the target white level, or at least very close thereto.

Moreover, the black level also needs to be calibrated to a target black level. It is important that the technique for white level calibration is compatible with the black level calibration. For example, typically the white level is calibrated by adjusting the amplifier gain, while the black level is calibrated by adjusted on offset to the same amplifier. Calibration of the white level should not negatively impact the ability of the black level calibration to properly converge to the target black level or vice versa.

Thus, there is a need to provide a white level calibration for an image scanning device. Further, the white level calibration should quickly and accurately converge to the target white level. Furthermore, it is desirable that the circuitry be compatible with circuitry and techniques for converging the black level to a target black level.

SUMMARY

The present invention provides a method and circuit that calibrates a white level for an image scanner. Embodiments of the present invention converge quickly and accurately to the target white level. Embodiments of the present application are compatible with circuitry and techniques for converging a black level to a target black level.

A method and circuit that calibrates a white level in an image scanning device is disclosed. In accordance with one embodiment, a method comprises accessing a target white level and determining a high white level for pixel data output by an amplifier. A gain adjustment to the amplifier is determined to correct a portion of an error between the target white level and the high white level. The gain adjustment is applied to the amplifier.

Another embodiment in accordance with the present invention is a white level calibration device. The device has an amplifier that is operable to receive and amplify pixel data. The device also has high white level logic that is operable to receive amplified pixel data from the amplifier and is further operable to determine a high white level of the amplified pixel data. The device also has gain calibration logic that is operable to calculate a new gain for the amplifier to correct a portion of an error between the target white level and the high white level.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 1:
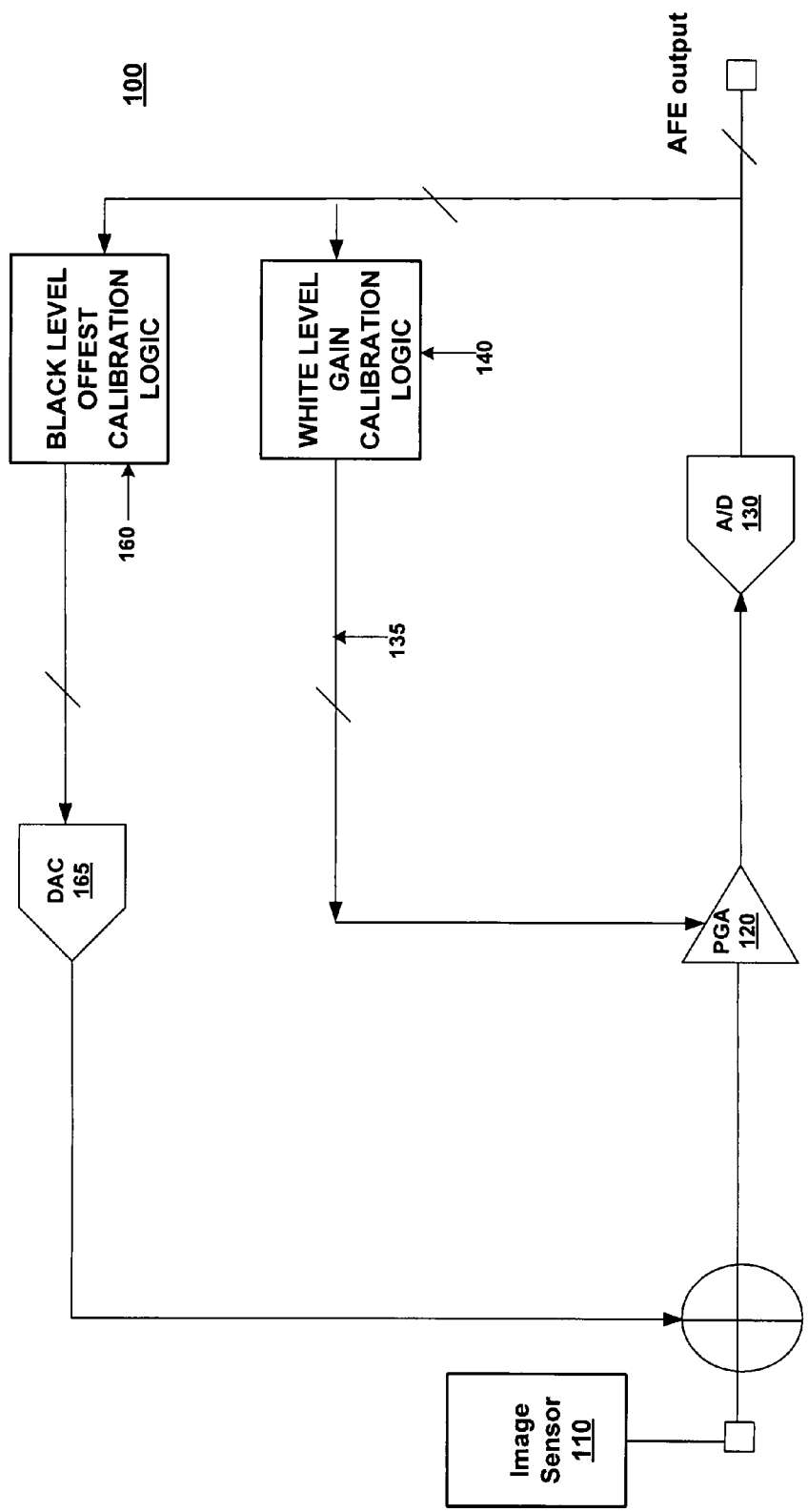
FIG. 1 depicts a block diagram of a circuit that calibrates white level codes, in accordance with an embodiment of the present invention.

FIG. 1 depicts a block diagram of a circuit 100 that calibrates white level codes, in accordance with an embodiment of the present invention. The circuit 100 has an image sensor 110, which may be implemented with a plurality of CCDs. The CCDs may be arranged in a line to capture a scan line of pixel data. Thus, there may be one CCD per pixel in a line. Typically, the output of the CCDs are input sequentially to the programmable gain amplifier (PGA) 120, which may be referred to as scanning a line. Then, another line of pixels may be scanned by capturing new data with the image sensor 110 and sequentially inputting the image data to the PGA 120.

The PGA 120 amplifies each pixel, in sequence, and outputs the amplified pixel data to the A/D 130. The A/D output codes may be used by a further stage (not depicted in FIG. 1) that processes the image.

FIG. 1 includes white level gain calibration logic 140, in accordance with an embodiment of the present invention. The white level gain calibration logic 140 inputs the output codes of the A/D 130 and outputs a gain correction signal 135 to program the PGA 120 to calibrate the white level to a target code. In one embodiment, the PGA 120, A/D 130, and white level calibration logic 140 reside on a single integrated circuit.

FIG. 1 also includes black level calibration logic 160, although it is not a requirement of the present invention. The black level calibration logic 160 inputs codes from the A/D 130 and determines an offset to adjust the black level when black level calibration is desired. The black level offset may be processed by a digital to analog converter (D/A) 165, which applies a new offset to the PGA 120. Thus, the black level may be calibrated by adjusting an offset of the PGA 120, whereas the white level may be calibrated by adjusting a gain of the PGA 120.

Figure 2:
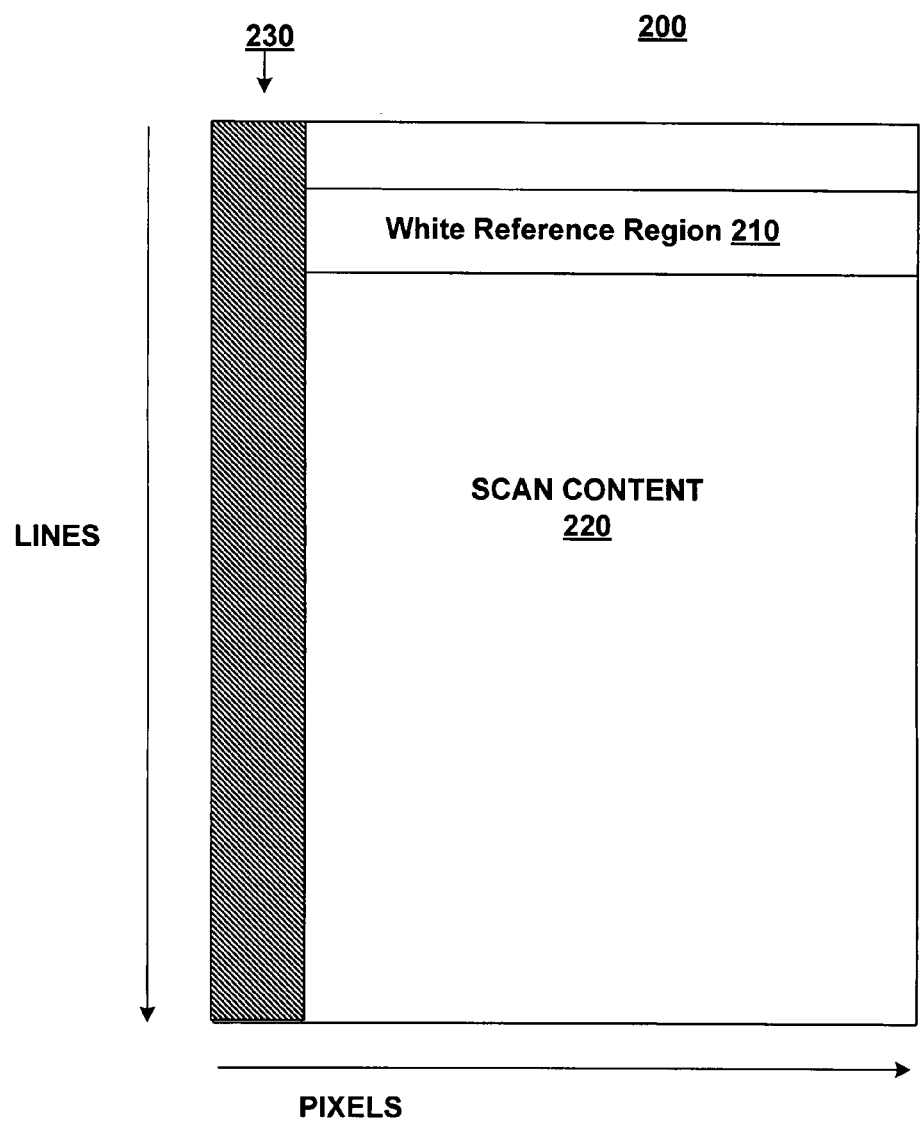
FIG. 2 depicts an exemplary scan page is used by an embodiment of the present invention to capture white reference data.

Referring now to the exemplary scan page 200 in FIG. 2, in typical operation each line of the scan page 200 is scanned, for example left to right. The lines may be scanned sequentially top to bottom. The white level is calibrated based on a white region 210 near the top of the scan page 200, in one embodiment. For example, lines 1-4 or 4-8 at the top may be used. The white reference region 210 may be a white area located on the inside of a photocopier or the like. Thus, the scan content 220 represents the actual area over which a document is placed for image scanning.

The beginning region 230 of scan lines may be used for black level calibration. Typically, this is achieved by placing a mask over CCDs at one end of the line of CCDs, such that their output is the black level. Thus, the beginning region 230 does not represent an actual object being scanned.

In accordance with an embodiment of the present invention, one line of the white reference region 210 is scanned to determine a high white level code output by the A/D. The high white level is not necessarily the absolute maximum code output by the A/D. For example, a moving average of the pixel data is performed in one embodiment. In another embodiment, pixel data identified as outliers is discarded prior to averaging.

After determining a high white level for a scan line, a gain correction is applied to the amplifier. Then, the next line may be scanned to determine a new high white level, wherein another gain correction is applied prior to scanning the next line. In accordance embodiments of the present invention, the gain correction is a portional correction. That is, rather than attempting to correct the entire error, only a portion is corrected with each scan line. Embodiments of the present invention apply an iterative calibration process. This allows the white level to be accurately and quickly calibrated. It also limits the possibility of overcorrection, which can impede the ability for the calibration process to converge to the target white level. Moreover, this technique is compatible with concurrent black level calibration.

Figure 3:
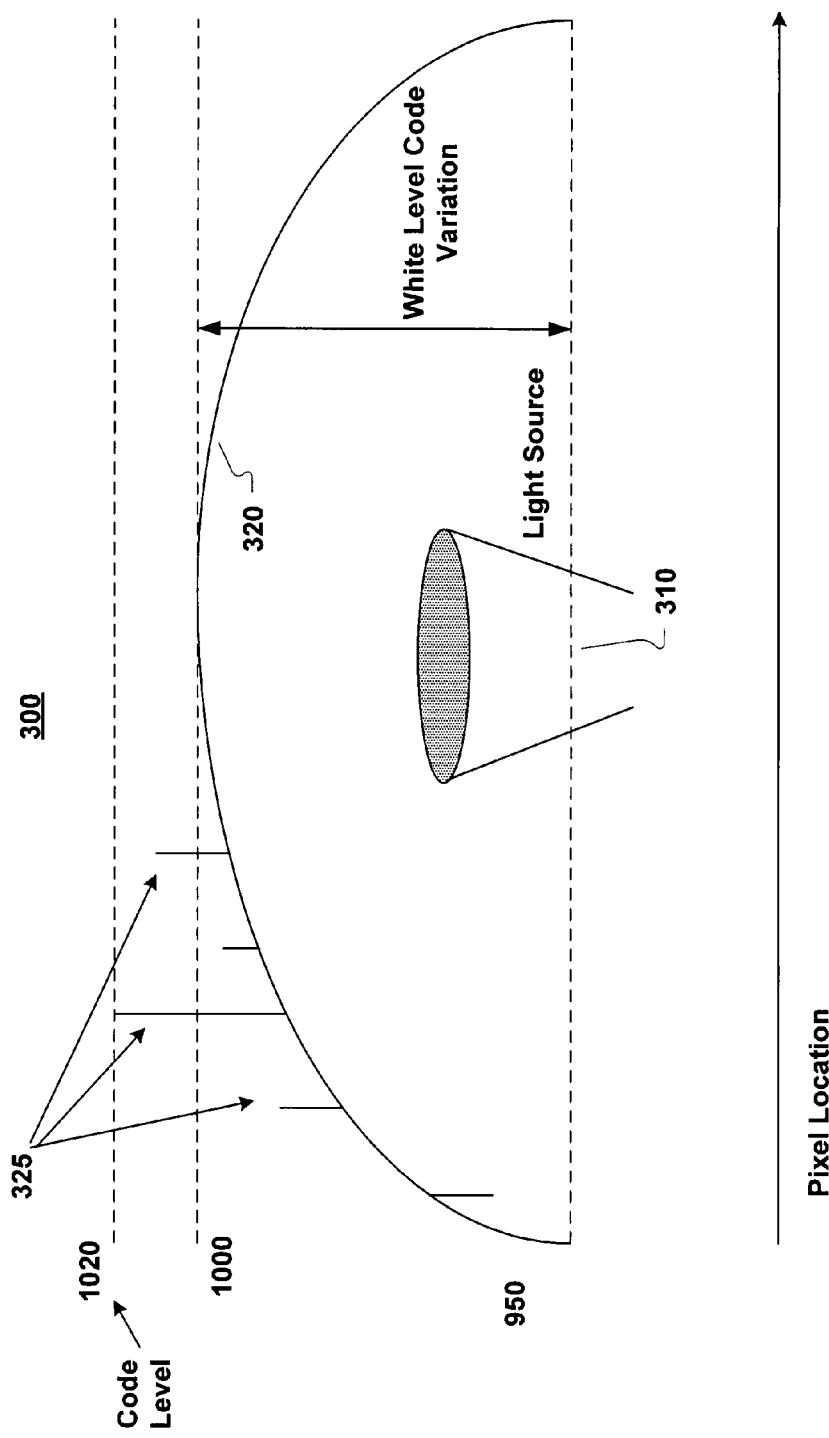
FIG. 3 depicts sample white level codes for a scan line, which an embodiment of the present invention analyzes to determine a high white level.

One reason for selecting a high white code for a scan line can be understood by examining FIG. 3, which depicts a graph 300 of typical scan white level codes for a scan line of white reference data. The graph 300 depicts the code level for pixels based on their physical location along the scan line. Due to the location of the light source 310, there may be a substantial variation of pixel data 320. For example, pixels in the middle of the scan line may be brighter than those near the edges. Furthermore, there may be "noisy" codes 325 as well. Performing a moving average of the data may help to reduce noise. Furthermore, an embodiment of the present invention discards outliers to reduce the possibility of averaging in noisy data 325 during the moving average calculation.

Figure 4:
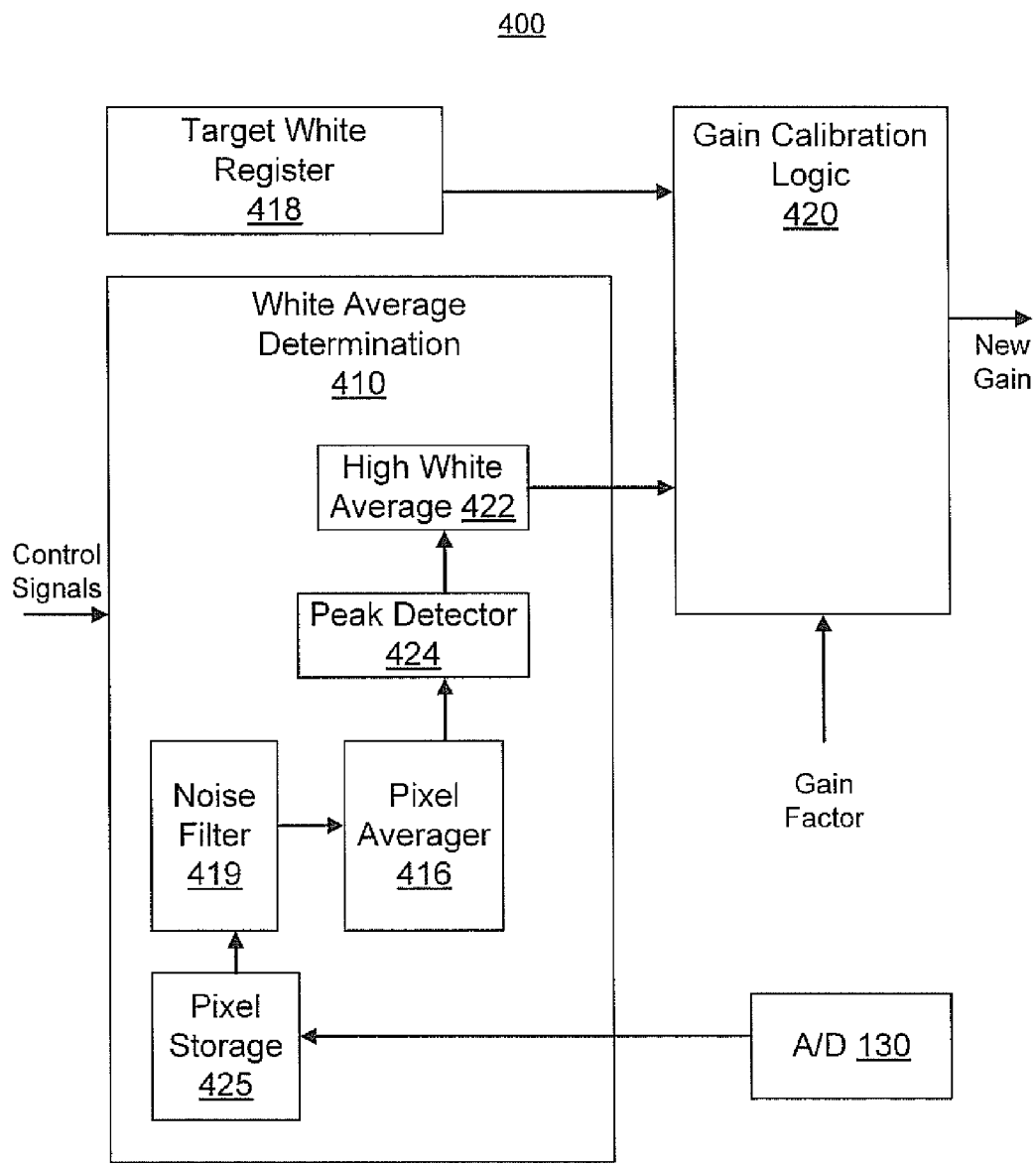
FIG. 4 depicts a block diagram of a circuit that determines a gain adjustment, in accordance with an embodiment of the present invention.

FIG. 4 depicts a circuit 400 that determines new gain settings of adjustments for a programmable gain amplifier in order to calibrate a white level, in accordance with an embodiment of the present invention. The circuit 400 has white average determination logic 410, which includes a pixel averager 416 that averages pixels. One embodiment of the present invention performs a moving average of groups of "N" pixels. For example, pixels 1 through N are averaged, then pixels 2 through N+1 are averaged, etc. The peak detector 424 may determine the highest value among the averages and store that value as the high (e.g., peak) white average 422. The determination logic 410 receives control signals indicating that the pixels are white reference data, wherein the pixel averaging process may be triggered. The A/D 130 outputs pixels, which are stored in the pixel storage 425, for example, a FIFO (first in first out) or a random access memory coupled to an A/D (FIG. 1, 130).

The white average determination logic 410 also has a noise filter 419, which may discard one or more pixels prior to averaging. In one embodiment, the highest and the lowest codes (pixels) in a group are discarded prior to averaging. In one embodiment, a group for averaging comprises N+2 pixels with two pixels (e.g., highest and lowest codes) discarded prior to averaging, where N is a power of two. However, any number of pixels may be discarded by the filter 419. Moreover, the group may be any size.

The gain calibration logic 420 inputs a target white level code, which may be stored in a register 418, and the high (e.g., peak) white average from the white average determination logic 410 and calculates new gain setting for the PGA (not depicted in FIG. 4). The gain calibration logic 420 calculates or estimates a gain that would be expected to correct the entire error in the white level. For example, this is a gain that would be suitable to cause the high white level to match the target white level. However, rather than attempting to correct the entire error, the logic 420 attempts to correct only a portion (e.g., a fraction) of the error. The portion may be any real number greater than zero and less than one, wherein a value of one would indicate correcting the entire error. For example, the logic 420 may attempt to correct ½ or ¼ of the error. The gain calibration logic 420 inputs a gain factor that may be a pre-programmed value. For example, a designer of a scanner incorporating circuit 400 may pre-program the gain factor. The gain factor defines what portion of the error should be corrected with each iteration of the correction process, in one embodiment. In one embodiment, the gain calibration logic 420 adapts the gain factor to results achieved by previous gain adjustments.

The following example will serve to illustrate calculation of gain adjustment for a case when the gain factor is ½. If the PGA currently has a gain of 1.0 and it is estimated that a new gain of 2.0 will cause the white level to match the target white level, the new gain is set to only 1.5. This ensures that the change in white level is not too abrupt, which may lead to problems converging to the target white level. For example, while it might be anticipated that a certain gain adjustment would achieve the target white level, there may be overshoot due to a miscalculation of the error due to any number of factors. Among those factors may be changes in the intensity of the scanning light, variances in the color or brightness of the white reference region, or temporary variances in properties of any of the image data processing circuitry.

After the gain adjustment is applied to the PGA, the process is repeated for the next scan line. The same gain factor may be used for this and further scan lines. However as an alternative, the gain factor can be altered in a pre-determined pattern. For example, with each successive scan line the gain factor can be made smaller or larger, or another pattern may be used. In accordance with one embodiment, the gain factor is adjusted dynamically based on the results achieved by applying previous gain adjustments. For example, if the actual correction of the white level is greater or smaller than expected, the next correction may be adapted to better converge to the target white level within the number of scan lines in the algorithm.

Figure 5:
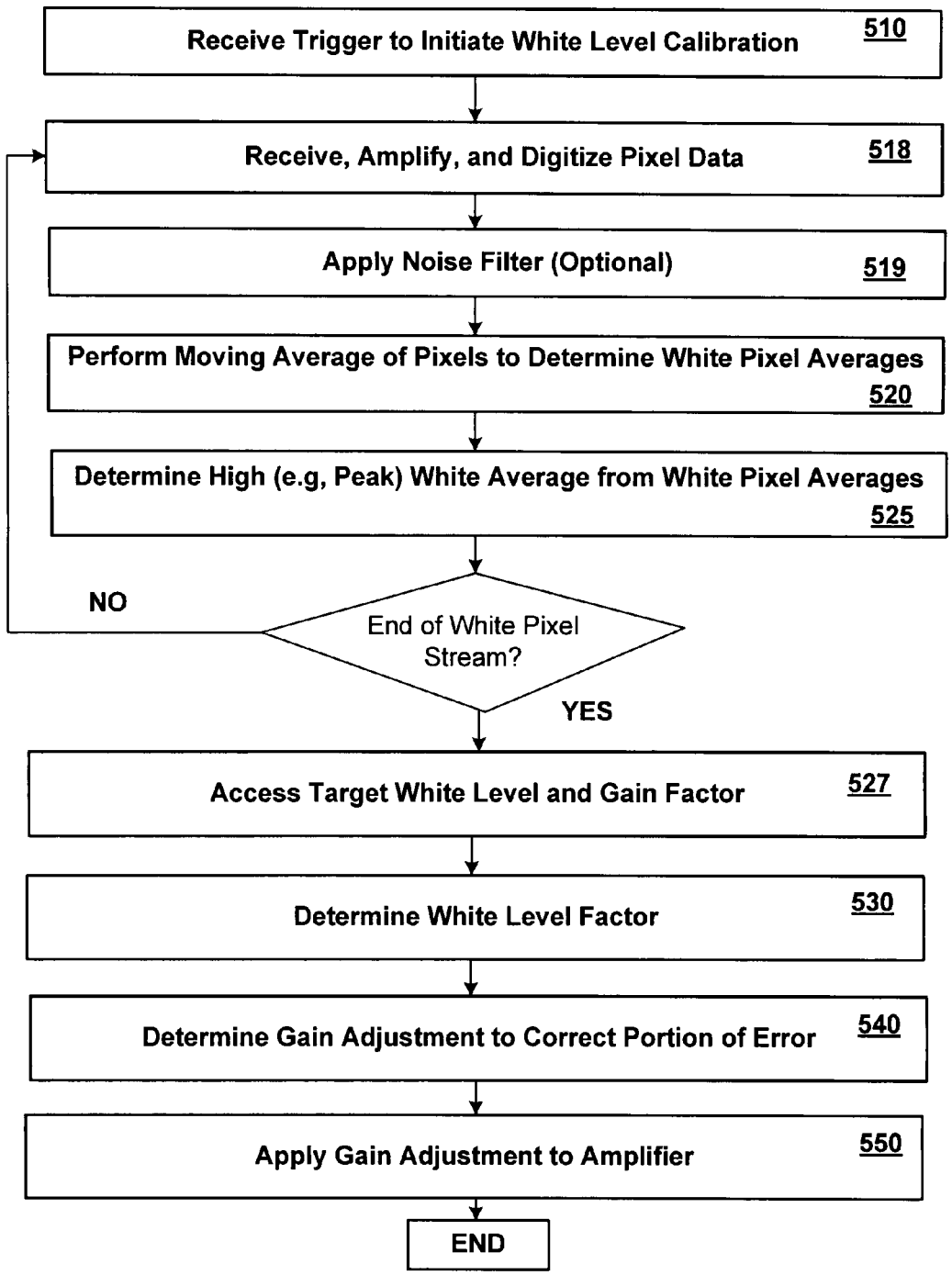
FIG. 5 is a flowchart illustrating a process of calibrating a white level, in accordance with an embodiment of the present invention.

FIG. 5 depicts a flowchart of a process 500 of calibrating a white level, in accordance with an embodiment of the present invention. In step 510 a white level trigger is received. The trigger informs white calibration circuitry that the pixels are treated as white pixels. In step 518, pixel data are received, amplified, and digitized.

Step 519 is an optional step of applying a noise filter to the digitized pixel data. For example, one or more pixels may be discarded prior to averaging a group of pixels in step 520. In one embodiment, the highest and lowest pixel value in the group is discarded prior to averaging.

In step 520, the pixels are averaged to determine white pixel averages. As previously discussed, groups of pixels in a scan line may be averaged in moving average. The group size may be any convenient value. The group may be a single pixel. Typical groups sizes are a few pixels to a few tens of pixels.

In step 525 a high (e.g., peak) white average is determined from the pixel averages. Typically, the high white average is for a scan line, although this is not required. For example, the high white average may be for a portion of a scan line or for more than one scan line. The process 500 repeats steps 518-525 until the white pixel stream has ended.

In step 527 a target white level and gain factor are accessed. In step 530, the difference between the target white level and the high white level is determined. Herein this is referred to as an error in the white level.

In step 540, a gain adjustment for the amplifier is determined to correct a portion of the error. The portion is based on the gain factor. If desired, the gain factor may be modified based on results of previous gain adjustments.

In step 550, the new gain is applied to the amplifier. The process 500 then ends, but may be repeated upon receiving another trigger (e.g., the trigger in step 510). In one embodiment, pixel data from the next scan line is processed in the next iteration of process 500. The same gain factor may be used or a different gain factor may be used in the next iteration of process 500.

Figure 6:
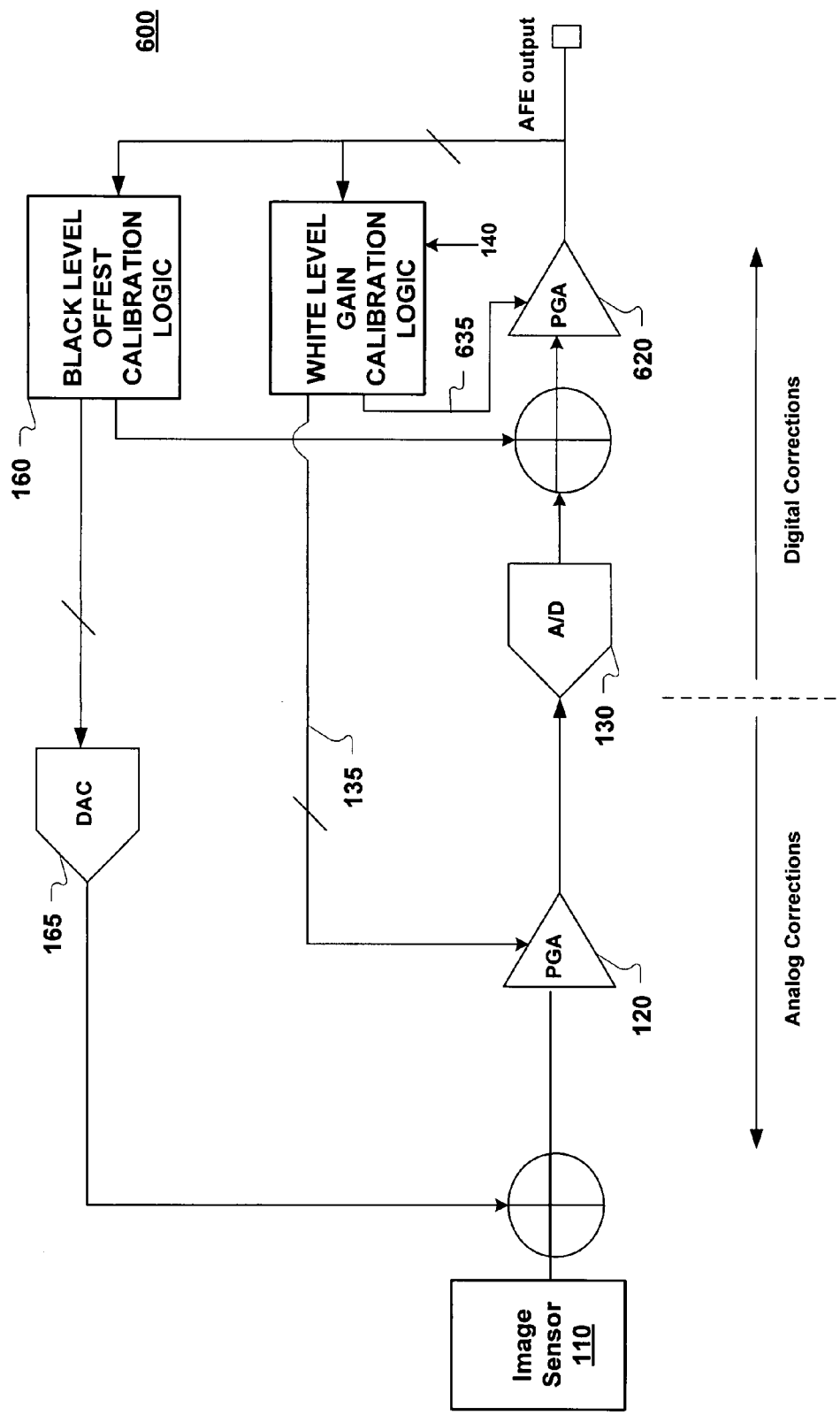
FIG. 6 depicts a block diagram of a circuit that calibrates a white level in both an analog and a digital domain, in accordance with an embodiment of the present invention.

FIG. 6 depicts an embodiment of the present invention in which there is a PGA both before and after the A/D. In this embodiment, the white level gain calibration (135, 635) may be applied to the PGA 120 before the A/D converter 130 and the PGA 620 after the A/D converter 130. In other words, this embodiment performs corrections in both the analog domain and the digital domain. The portional corrections to perform white level adjustments discussed herein may be performed in only the digital domain, only the analog domain, or both.

Still referring to FIG. 6, there may be any number of PGAs (120, 620) on either side of the A/D converter 130. For example, if two PGAs 120 are used in the analog side, the gain to one or both of the PGAs 120 may be adjusted during white level calibration, in accordance with embodiments of the present invention.

Typically, there will be a number of white level calibration loops, in accordance with embodiments of the present invention. For example, an image scanner may have a different group of CCDs for red, blue and green. A different PGA and A/D converter may be used for each color. Moreover, each color may use more than one PGA. For example, all of the odd CCD pixels may be coupled to a first PGA and all of the even CCD pixels to a second PGA. Therefore, there might be six different white level calibration loops. Because of differences between the PGAs and other components, it may be that a different gain should be applied to each PGA.

Therefore, it will be seen that embodiments of the present invention provide a method and circuit that calibrate a white level. Embodiments of the present invention converge to a target white level quickly and accurately. Embodiments of the present invention are compatible with black level calibration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of calibrating a white level in an image scanning device, said method comprising:
   a) accessing a target white level in said image scanning device;
   b) determining a high white level for pixel data output by an amplifier, wherein said pixel data output is obtained by scanning white reference data;
   c) determining a gain adjustment for said amplifier to correct an error between said target white level and said high white level, wherein said gain adjustment is based on a change in said high white level, and wherein said gain adjustment is not yet applied to said amplifier;
   d) determining a single gain factor, wherein said single gain factor is applied to said gain adjustment such that said gain adjustment when applied to said amplifier will correct a portion of said error, wherein said portion is less than the entire said error, wherein said determining said single gain factor comprises accessing a first value from a pattern of predetermined values, wherein said predetermined values are in a predetermined order; and
   e) applying said gain adjustment with said single gain factor to said amplifier;

further comprising, after applying said gain adjustment to said amplifier:
f) determining a new high white level for pixel data output by said amplifier;
g) determining a new gain adjustment to correct an error between said target white level and said new high white level, and wherein said new gain adjustment is not yet applied to said amplifier;
h) determining a new single gain factor, wherein said new single gain factor is applied to said new gain adjustment such that said new gain adjustment when applied to said amplifier will correct a portion of said error, wherein said portion is less than the entire said error, wherein determining said new single gain factor comprises accessing a second value from said pattern of predetermined values, wherein said second value is the next value in said pattern of predetermined values after said first value; and
i) applying said new gain adjustment with said new single gain factor to said amplifier.

2. A method in accordance with claim 1, wherein said determining the high white level comprises performing a moving average of intensity values for a scan line of white reference data.

3. A method in accordance with claim 2, wherein said performing the moving average comprises discarding an outlying code prior to averaging a group of pixels.

4. A method in accordance with claim 2, wherein said performing the moving average comprises discarding the highest code and the lowest code prior to averaging a group of pixels.

5. A method in accordance with claim 1, wherein the gain factors in said d) and said h) are the same percentage value.

6. A method in accordance with claim 1, wherein the gain factors in said d) and said h) are different percentage values.

7. A white level calibration device, said device comprising:
an amplifier that is operable to receive and amplify pixel data;
a high white level logic that is operable to receive amplified pixel data from said amplifier and is further operable to determine a high white level of said amplified pixel data; and
a gain calibration logic that is operable to calculate a gain adjustment for said amplifier to correct an error between a target white level and said high white level, wherein said target white level is a value stored in a register of said device, and wherein said gain adjustment is based on a change in said high white level, and wherein said calculated gain adjustment is not yet applied to said amplifier, and wherein said gain calibration logic is operable determine a first gain adjustment for said amplifier to correct a portion of said error between said target white level and said high white level, wherein said portion is less than the entire said error, wherein said portion is based on a gain factor, wherein said gain adjustment is based on a change in said high white code level, wherein said gain calibration logic is further operable to program said amplifier to implement said first gain adjustment prior to receiving additional pixel data, and wherein prior to determining a second gain adjustment for said additional pixel data, modifying said gain factor based on an analysis of results of applying said first gain adjustment for said pixel data.

8. A device as recited in claim 7, wherein said high white level logic is further operable to perform a moving average of a plurality of pixels of said amplified pixel data.

9. A device as recited in claim 8 further comprising a noise filter that removes noisy codes prior to performing said moving average.

10. A device as recited in claim 7, further comprising:
an analog-to-digital converter that receives the amplified pixel data and outputs white level codes; and
a digital amplifier that receives said white level codes; and
wherein said gain calibration logic is further operable to calculate a gain correction for said digital amplifier.

11. A device as recited in claim 7, wherein said amplifier, said high white level logic, and said gain calibration logic comprises a white level calibration loop for a channel of image data.

12. A method of calibrating a white level in an image scanning device, said method comprising:
accessing a target white code level in said image scanning device;
determining a gain correction factor;
for a plurality of scan lines of a white reference region of a scan page performing the following:
receiving one of said scan lines of said white reference region as pixel data;
amplifying said pixel data with a programmable amplifier;
digitizing said pixel data after said amplifying to generate white codes;
determining a high white code level of said white codes;
determining a gain adjustment for said programmable amplifier to correct a portion of an error between said target white code level and said high white code level, wherein said portion is less than the entire said error, wherein said portion is based on said gain correction factor, and wherein said gain adjustment is based on a change in said high white code level; and
programming said programmable amplifier to implement said gain adjustment prior to receiving another of said scan lines, wherein prior to determining a gain adjustment for a second of said scan lines, modifying said gain correction factor based on an analysis of results of applying said gain adjustments for a first of said scan lines.

13. A method in accordance with claim 12, wherein said determining the high white code level comprises performing a moving average of groups of said white codes.

14. A method in accordance with claim 13, wherein said performing the moving average comprises discarding an outlying one of said white codes prior to averaging.

15. A method in accordance with claim 13, wherein said performing the moving average comprises discarding a highest white code and a lowest white code prior to averaging.

* * * * *